US010267615B2

(12) United States Patent
May

(10) Patent No.: US 10,267,615 B2
(45) Date of Patent: *Apr. 23, 2019

(54) DISTANCE MEASUREMENT SENSOR BASED ON MAGNETIC SIGNAL TRIANGULATION

(71) Applicant: Stemco Products, Inc., Charlotte, NC (US)

(72) Inventor: Lutz May, Berg (DE)

(73) Assignee: STEMCO PRODUCTS, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,875

(22) Filed: Dec. 19, 2016

(65) Prior Publication Data

US 2017/0160071 A1 Jun. 8, 2017

Related U.S. Application Data

(63) Continuation of application No. 14/248,703, filed on Apr. 9, 2014, now Pat. No. 9,562,758.

(30) Foreign Application Priority Data

Apr. 15, 2013 (EP) .................................... 13163793

(51) Int. Cl.
 *G01B 7/14* (2006.01)
 *G01B 7/02* (2006.01)
 (Continued)

(52) U.S. Cl.
 CPC ................ *G01B 7/14* (2013.01); *B60G 11/27* (2013.01); *B60G 17/056* (2013.01); *G01B 7/023* (2013.01);
 (Continued)

(58) Field of Classification Search
 CPC ........ G01B 7/14; G01B 7/023; G01B 11/026; G01B 11/27; G01B 11/14; G01B 17/056;
 (Continued)

(56) References Cited

U.S. PATENT DOCUMENTS 4,622,644 A 11/1986 Hansen
5,521,497 A 5/1996 Schneider et al.
(Continued)

FOREIGN PATENT DOCUMENTS

DE 102006017275 A1 10/2007
DE 102008064647 A1 2/2010
(Continued)

OTHER PUBLICATIONS

European Patent Office, Extended European Search Report, EP Patent Application 14164615.8, dated Jul. 3, 2014, 7 pages.
(Continued)

*Primary Examiner* — Son T Le
(74) *Attorney, Agent, or Firm* — Perkins Coie LLP

(57) ABSTRACT

The subject invention reveals a distance measuring device comprising: a sensing module, a target module, and an evaluating module, wherein the sensing module and the target module are mountable so as to execute a movement with respect to each other along a movement trajectory, wherein the target module comprises a magnetic field generating element having a magnetic pole axis, wherein the sensing module comprises a first magnetic field sensing array being arranged distant to the movement trajectory. The sensing module and the target module can advantageously be situated within the pressurizable chamber of an air spring which is defined by (contained within) a first mounting plate, a second mounting plate, and a flexible member of the air spring.

20 Claims, 6 Drawing Sheets

(51) Int. Cl.
*B60G 11/27* (2006.01)
*B60G 17/056* (2006.01)

(52) U.S. Cl.
CPC .. *B60G 2202/152* (2013.01); *B60G 2500/201* (2013.01); *B60G 2600/22* (2013.01)

(58) Field of Classification Search
CPC .............. G01B 21/16; B60G 2202/152; B60G 2500/201; B60G 2600/22; G01R 5/20; G01R 33/07
See application file for complete search history.

(56) References Cited

U.S. PATENT DOCUMENTS

| | | | | |
|---|---|---|---|---|
| 5,646,525 | A | * | 7/1997 | Gilboa ................... F41G 3/225 324/207.17 |
| 9,562,758 | B2 | | 2/2017 | May |
| 2009/0128139 | A1 | | 5/2009 | Drenth et al. |
| 2012/0056616 | A1 | * | 3/2012 | May .......................... F16F 9/04 324/207.15 |
| 2014/0124994 | A1 | | 5/2014 | May |

FOREIGN PATENT DOCUMENTS

| | | |
|---|---|---|
| EP | 0979988 A1 | 2/2000 |
| EP | 1243898 A1 | 9/2002 |
| EP | 1845278 A1 | 10/2007 |
| EP | 2362189 A2 | 8/2011 |
| EP | 2366972 A2 | 9/2011 |
| WO | 0243045 A1 | 5/2002 |

OTHER PUBLICATIONS

PCT/EP2017/056428 International Search Report dated May 16, 2017.

\* cited by examiner

DISTANCE MEASUREMENT SENSOR BASED ON MAGNETIC SIGNAL TRIANGULATION

This application claims benefit of European Patent Application Serial No. EP 13163793.6, filed on Apr. 15, 2013. The teachings of European Patent Application EP 13163793.6 are incorporated herein by reference in their entirety.

TECHNICAL FIELD OF THE INVENTION

The present invention relates to a distance measurement sensor based on magnetic signal triangulation which is useful for utilization in conjunction with air springs.

BACKGROUND OF THE INVENTION

Height or distance measurement has a wide variety of possible applications. For instance, it is a parameter that frequently needs to be monitored to optimize the performance of various types of machinery and vehicles, such as automobiles, trucks, trains, agricultural vehicles, mining vehicles, construction vehicles, and the like. For instance, monitoring height and various distances can lead to reduced fuel consumption, improved comfort, reduced overall cost, extended product service life, and safety. In any case, the need to monitor such distance parameters generally increases with sophistication of the devise and the complexity of its features.

Virtually every aspect of complex machinery may need to be tightly monitored and controlled to attain maximum advantages. For instance, constant adaptations may be required to optimize the performances and efficiency of almost every moving part of the machinery. This typically needs to be done while the operational conditions in the environment of the equipment are subject to change and can change significantly over very short time frames. Changing environmental conditions are virtually always encountered by vehicle. In addition to this vehicles frequently operate under changing conditions which can make monitoring a difficult challenge. For instance, monitoring suspension height by distance measurements between air spring components can yield useful information. However, the environment where the height measurement is being made can present a wide variety of challenges. For example, in measuring the height of a vehicle frame above the surface of a road, challenges are typically presented by road noise, dirt, dust, and vibrations which are normally present in the environment surrounding the vehicle where the measurement is being taken.

DE 10 2006 017 275 A1 and EP 1845278 A1 describe an air spring having an integrated positioning device, wherein the distance between two parts of the air spring can be measured by an analogue proximity sensor. Commonly used proximity sensors are, for example, based on an ultrasonic measurement principle which is very sensitive in noisy and vibrating environments, as the acoustic noise and the ultrasonic measurement principle are based on the same physical principle, i.e. sound propagation. These pneumatic air springs have an integrated height measuring device, a pressure chamber or an inner chamber. The exterior of the inner chamber is aligned in the analog proximity sensor and a metal plate is arranged opposite to the interior of the proximity sensor. The proximity sensor and the metal plate are formed pre-adjustable to each other.

Further, DE 10 2008 064 647 A1 describes an air spring for a vehicle having a measuring device, which measuring device may transmit data and energy via predetermined and fixed distance contactless. This pneumatic cushioning equipment has a base unit which has a pressure source and a valve unit which has an air supply made of non-metallic material, particularly plastic. A switching valve of the base unit is provided between the pressure source and appropriate valve unit of the arranged air supply.

United States Patent Publication No. 2012/0056616 A1 and EP 2 366 972 describe a sensor device for height measurement in an air spring and a corresponding method allowing determining changes in a working stroke of the air spring. These publications more specifically disclose a sensor device for a height measurement, comprising: a transceiving coil arrangement including at least one transceiving coil; a transmitting drive unit; a receiver unit; a reference coil arrangement; and a reference control unit, wherein the transceiving coil arrangement is coupled to both the transmitting drive circuit and the receiver unit, wherein the reference control unit is coupled to the reference coil arrangement, wherein the reference coil arrangement is movably positioned with respect to the transceiving coil arrangement, wherein the drive unit is adapted to drive the transceiving coil arrangement with an AC power signal of a predetermined duration for generating a magnetic field, wherein the reference control unit is adapted for accumulating energy out of the generated magnetic field and for generating a reference signal based on an amount of the accumulated energy, and wherein the receiver unit is adapted for receiving the reference signal and for outputting a signal for determining a distance between the transceiving coil arrangement and the reference coil arrangement based on at least one out of a group, the group consisting of the reference signal and the duration of the AC power signal.

SUMMARY OF THE INVENTION

It may be seen as an objective technical problem to provide an air spring with improved capabilities for supplying physical parameter measurement equipment. In particular, the physical parameter measurement equipment may be adapted for acquiring parameters like suspension height, pneumatic air pressure, and temperature.

The distance measuring device which can be incorporated into the air springs of this invention are comprised of a sensing module (1), a target module (3), and an evaluating module, wherein the sensing module and the target module are mountable so as to execute a movement with respect to each other along a movement trajectory, wherein the target module (3) comprises a magnetic field generating element having a magnetic pole axis, wherein the sensing module comprises a first magnetic field sensing array (MFS1) being arranged distant to the movement trajectory, the first magnetic field sensing array comprises a first magnetic field sensor (L2) and a second magnetic field sensor (L3), wherein a main sensing direction of the first magnetic field sensor (L2) of the first magnetic field sensing array (MFS1) is inclined with respect to a main sensing direction of the second magnetic field sensor (L3) of the first magnetic field sensing array (MFS1), so as to be capable of sensing the spatial distance to the magnetic field generating element, wherein the sensing module is connected to the evaluating module to transfer the sensed signals of the magnetic field sensors, and wherein the evaluating module is adapted to determine the spatial distance of the first magnetic field sensor (L2) and the second magnetic field sensor (L3) to the magnetic field generating element based on an orientation of the main sensing direction of the first magnetic field sensor and the main sensing direction of the second magnetic field sensor, and the sensed signal of the first magnetic field sensor and the second magnetic field sensor.

In one specific embodiment of this invention the magnetic field generating element of the target module (3) comprises a permanent magnet having the magnetic pole axis. In another specific embodiment of this invention the magnetic pole axis is aligned to the movement trajectory. In a further specific embodiment of this invention the main sensing direction of the first magnetic field sensor (L2) of the first magnetic field sensing array (MFS1) is substantially orthogonal to the main sensing direction of the second magnetic field sensor (L3) of the first magnetic field sensing array (MFS1), wherein the main sensing direction of the first magnetic field sensor (L2) of the first magnetic field sensing array (MFS1) is substantially parallel to the movement trajectory and the main sensing direction of the second magnetic field sensor (L3) of the first magnetic field sensing array (MFS1) is substantially orthogonal to the movement trajectory.

In still another embodiment of this invention the sensing module comprises a second magnetic field sensing array (MFS2) to provide in combination with the first magnetic field sensing array (MFS1) a differential mode sensor, wherein the second magnetic field sensing array has a predetermined distance (b) to the first magnetic field sensing array. In a further specific embodiment of this invention the first magnetic field sensing array (MFS1), the second magnetic field sensing array (MFS2) and the magnetic field generating element (3) form a substantially rectangular triangle, with the second magnetic field sensing array at the rectangle and on the movement trajectory.

In a further embodiment of this invention the second magnetic field sensing array (MFS2) comprises a first magnetic field sensor (L1) and a second magnetic field sensor (L0), wherein the main sensing direction of the first magnetic field sensor (L1) of the second magnetic field sensing array (MFS2) is inclined with respect to the main sensing direction of the second magnetic field sensor (L0) of the second magnetic field sensing array (MFS2). In another embodiment of the subject invention the main sensing direction of the first magnetic field sensor (L1) of the second magnetic field sensing array (MFS2) is substantially orthogonal to the main sensing direction of the second magnetic field sensor (L0) of the second magnetic field sensing array.

In still another embodiment of this invention the main sensing direction of the first magnetic field sensor (L1) of the second magnetic field sensing array (MFS2) is substantially orthogonal to the main sensing direction of the second magnetic field sensor (L0) of the second magnetic field sensing array (MFS2), wherein the main sensing direction of the first magnetic field sensor (L1) of the second magnetic field sensing array (MFS2) is substantially parallel to the movement trajectory and the main sensing direction of the second magnetic field sensor (L0) of the second magnetic field sensing array (MFS2) is substantially orthogonal to the movement trajectory. In a further embodiment of this invention the movement trajectory is a substantially straight line, so that a magnetic pole axis of the magnetic field generating element is oriented towards the first magnetic field sensing array.

The subject invention further reveals an air spring comprising: a first mounting plate being adapted to be mounted to a chassis of a vehicle, a second mounting plate being adapted to be mounted to a wheel suspension, and a distance measuring, wherein the distance measuring device is comprised of: a sensing module (1), a target module (3), and an evaluating module, wherein the sensing module and the target module are mountable so as to execute a movement with respect to each other along a movement trajectory, wherein the target module (3) comprises a magnetic field generating element having a magnetic pole axis, wherein the sensing module comprises a first magnetic field sensing array (MFS1) being arranged distant to the movement trajectory, the first magnetic field sensing array comprises a first magnetic field sensor (L2) and a second magnetic field sensor (L3), wherein a main sensing direction of the first magnetic field sensor (L2) of the first magnetic field sensing array (MFS1) is inclined with respect to a main sensing direction of the second magnetic field sensor (L3) of the first magnetic field sensing array (MFS1), so as to be capable of sensing the spatial distance to the magnetic field generating element, wherein the sensing module is connected to the evaluating module to transfer the sensed signals of the magnetic field sensors, and wherein the evaluating module is adapted to determine the spatial distance of the first magnetic field sensor (L2) and the second magnetic field sensor (L3) to the magnetic field generating element based on an orientation of the main sensing direction of the first magnetic field sensor and the main sensing direction of the second magnetic field sensor, and the sensed signal of the first magnetic field sensor and the second magnetic field sensor, and wherein the sensing module (1, 2) is mounted to the first mounting plate, and wherein the target module (3) is mounted to the second mounting plate.

The subject invention also reveals an air spring comprising a piston, a top plate, a flexible member, and a distance sensor, wherein the flexible member is affixed to the piston and the top plate, wherein the piston, the top plate and the flexible member define a pressurizable chamber, wherein the distance sensor comprises a sensing module (1), a target module (3), and an evaluating module, wherein the sensing module and the target module are mountable so as to execute a movement with respect to each other along a movement trajectory, wherein the sensing module and the target module are situated within the pressurizable chamber, wherein the target module (3) comprises a magnetic field generating element having a magnetic pole axis, wherein the sensing module comprises a first magnetic field sensing array (MFS1) being arranged distant to the movement trajectory, the first magnetic field sensing array comprises a first magnetic field sensor (L2) and a second magnetic field sensor (L3), wherein a main sensing direction of the first magnetic field sensor (L2) of the first magnetic field sensing array (MFS1) is inclined with respect to a main sensing direction of the second magnetic field sensor (L3) of the first magnetic field sensing array (MFS1), so as to be capable of sensing the spatial distance to the magnetic field generating element, wherein the sensing module is connected to the evaluating module to transfer the sensed signals of the magnetic field sensors, and wherein the evaluating module is adapted to determine the spatial distance of the first magnetic field sensor (L2) and the second magnetic field sensor (L3) to the magnetic field generating element based on an orientation of the main sensing direction of the first magnetic field sensor and the main sensing direction of the second magnetic field sensor, and the sensed signal of the first magnetic field sensor and the second magnetic field sensor.

This invention offers an array of benefits. For instance, wiring connections can be from only from one end of the air-spring (such as from and to the base point). Also, there is no need to provide electric power or any other wiring to the target point which is placed opposite to the base point. The target-point is a passive component which offers high reliability and a low risk of failure. The Magnetic Field Sensor (MFS) array is relatively small and fits easily inside the rubber belly of the air-spring. Optionally, the MFS array can be placed outside of the flexible member (belly) of the air-spring.

There is no need to breach then air-tight enclosure of the flexible member (rubber belly) for the sensor system to function. Low design complexity and low cost design can be achieved with the air springs of this invention. Any type of directionally sensitive Magnetic Field Sensing (MFS) devices can be used, as long as they can differentiate between positive and negative magnetic field strength. This includes but is not limited to: inductors (requires flux gate electronics, Hall-effect, MR, and GMR.

Virtually any desired measurement signal bandwidth can be achieved as this sensing technology is measuring a static magnetic field source (is not relying on an alternating magnetic field source signal). Therefore the sensing technology of this invention is very fast responding when trying to measure not only the absolute position of the target-point in relation to the base-point, but also trying to determine and quantify potential Air-Spring vibrations. In the practice of this invention the applied magnetic field sensor (MFS) array cancels the unwanted effects caused by uniform magnetic stray fields. This sensor solution is also insensitive to the magnetic field of the Earth.

These and other aspects of the present invention will become apparent from and elucidated with reference to the embodiments described hereinafter.

DETAILED DESCRIPTION OF THE INVENTION

Figure 1:
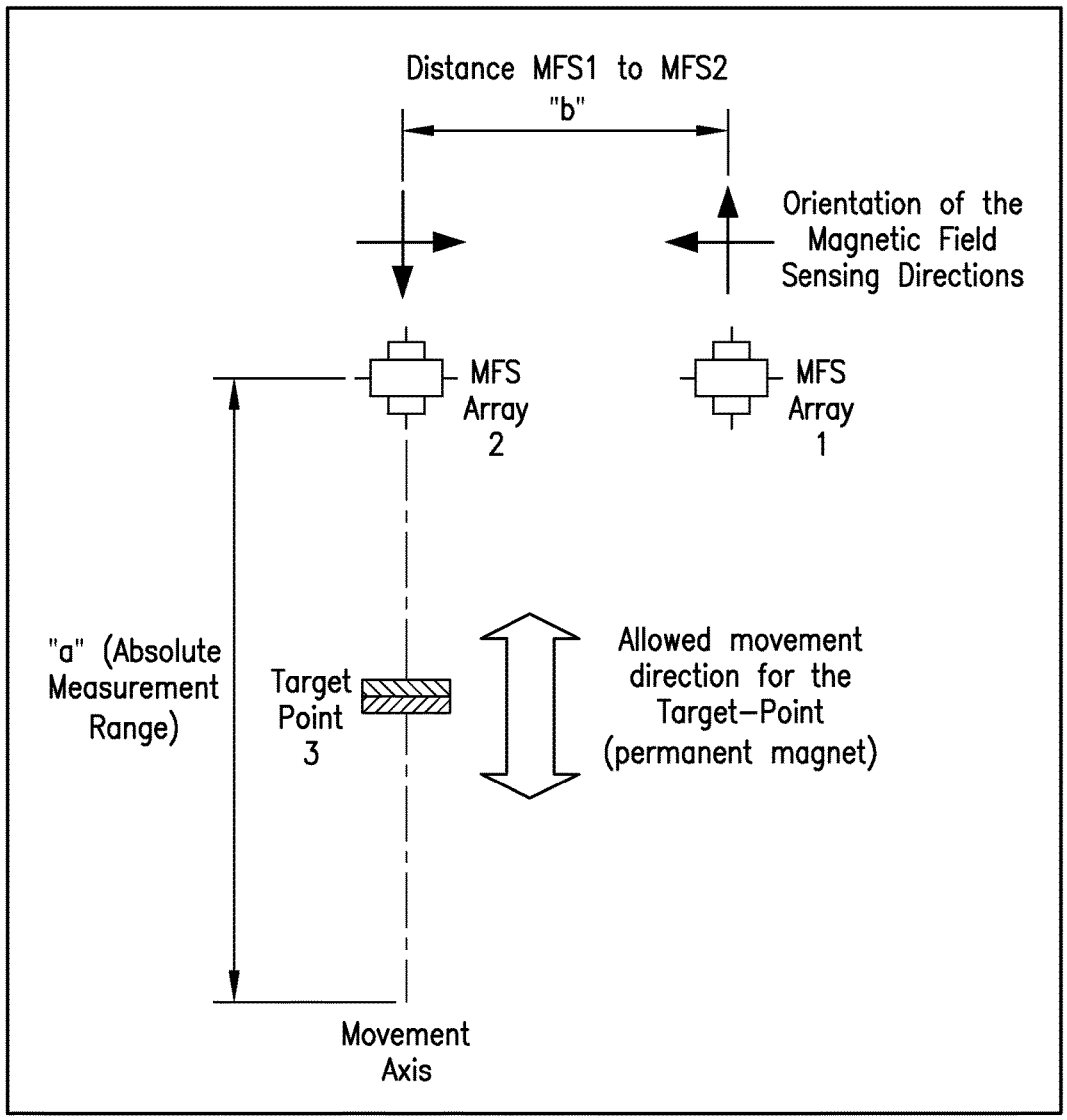
FIG. 1 illustrates a non-contact distance sensor system in accordance with this invention.

For purposes hereof it should be understood that in referring to distances between two points the points are a base point (from where the measurement will start) and the target point to which the distance is measured. When aiming for a non-contact distance measurement solution, and when placing the distance sensing system at the base point, then the used measurement system has to be able to physically "detect", "feel", or "sense" the target point, in some way. There are more than 10 fundamental different ways to accomplish this purpose. Some of these solutions can be optically based (such as visible light, and invisible light), sound based (for instance, audible and non-audible sounds) or physical based measurements. The measurement solution which is best suited for a specific application is depending on many factors, including: environmental conditions (interfering lights, interfering sound, changing ambient pressure, temperature, dust, and humidity), space availability for the measurement system, the targeted measurement range (millimeters, meters, kilometers), required measurement resolution and absolute accuracy, cost limitations, and the like.

The herein described distance measurement solution is specifically directed to pneumatic powered, air-spring applications. It is applicable to the air springs which are employed in a wide variety of applications including, but not limited to machinery and vehicles, such as automobiles, trucks, trains, agricultural vehicles, mining vehicles, construction vehicles, and the like.

The air-spring design to which this invention is applicable includes a flexible member (an elastic rubber belly) that is mounded in an air-tight manner onto top and bottom plates to define an air tight (pressurizable) chamber. By pumping pressured air into the pressurizable chamber the air-spring will expand and by releasing the air from the pressurizable chamber the air-spring will begin to collapse. Usually mechanically controlled or electrically controlled pneumatic vales are used to change the amount of air within the pressurizable chamber of the air spring.

The total maximum distance that needs to be measured is equivalent to the working stroke range of the air-spring. The total working stroke of an air-spring is the difference in distance between when the air-spring is fully expanded (the maximal working length of the air-spring) and when the air-spring is fully contracted (the shortest possible working length of the air-spring). In other words, this working stroke is the changes in length of the air-spring when fully pumped-up (maximum practical air-volume within the air-spring belly) and when almost all of the air inside the air-spring has been pumped-out (lowest practical air-volume within the air-spring belly). The term "air" as used in this context includes any gas or mixtures of gasses which is inert to the air spring and includes air, nitrogen, helium, other Noble gases, nitrogen enhanced air and helium enhanced air.

For purposes hereof the targeted distance measurement is typically within the range of a few millimeters to around 400 millimeters. The targeted measurement resolution and measurement repeatability is typically within the range of about 1 mm to 5 mm. The fundamental design characteristics of a standard air-spring make it difficult or near impossible to apply typical distance measurement solutions. For instance, the flexible member (rubber belly) the pressurizable chamber. It is also very inconvenient and increases cost in scenarios where air-tight passages need to be tooled into the top or bottom plate of the air spring to accommodate electric cables for electric power supply or other purposes. Additionally air-tight connectors of any type are expensive and will typically have an adverse effect on the reliability of the air-springs utilizing such technology.

The air-pressure inside the air-spring belly constantly changes during normal usage. As the air pressure changes the quality and composition of the air is also subject to continual change. Such changes in for instance the level of humidity and contaminants (dust in the air) can dramatically affect sound based measurement systems. Humidity and dust will also have a negative effect when using light based sensing technologies.

The sensing solution of this invention will operate on magnetic principles as they are not affected by light, sound, air-pressure, dust, and/or humidity. In addition, magnetic field based sensor systems can easily penetrate the rubber belly of an air spring, which allows for the magnetic based sensor system to be mounted outside of the rubber belly of the air spring.

The sensor system of this invention consist of three main parts: (1) the sensing module (or Magnetic Field Sensor Array), the sensor electronics, and the target-point. The sensing module and the sensing electronics are connected with each other by a number of insulated electrical wires (for example 4 wires can be utilized. The sensing module can be placed at the one end of the air-spring and can be referred to as the base-point. The sensor electronics can be powered by a low DC (direct current) voltage. The target-point is typically a small and high strength permanent magnet. The physical dimension and the absolute surface-magnetic-field-strengths of the permanent magnet are subject to a number of application dictated parameters, including the measurement distance to be covered, available space, and environmental factors, including ferro-magnetic objects that may be situated near to the measurement path. For purposes hereof the "measurement path" is a vertical straight line between the target-point and the base point. In general, larger more powerful permanent magnets are needed with larger measurement distances with stronger surface-magnetic-field-strengths being required. In any case, the area around the measurement should be free of moving ferro-magnetic objects as they can interfere negatively with the distance measurement to be taken. However, within limits, static (not moving) ferro-magnetic objects can be tolerated with appropriate correction factors.

FIG. 1 illustrates the final design of the Non-Contact Distance Sensor system (sensing module and Target-Point only. Not shown is the sensor electronics and the wiring to the electronics.). A permanent magnet (Target-Point 3) is moving up and down the "movement axis", whereby the magnetic pole-axis of the permanent magnet has to be aligned with the movement axis. The movement axis is a straight line and goes through the Base-Point, where the Magnetic Field Sensor (MFS) array 2 is placed. The distance "b" between the two MFS sensing arrays (MFS 1 and MFS 2) is a fixed value and cannot be changed in a given application. The distance "b" and the magnetic field strength of the permanent magnet (Target Point 3) defines the maximal possible measurement range or "distance" "a".

When flipping around the magnetic pole axis of the permanent magnet by 90 degree (for example), then the possible absolute measurement range "a" will be greatly reduced. At the same time the sensitivity towards ferro-magnetic objects that are placed nearby will significantly increase.

The two MFS arrays are required to build a differential mode sensors in order to compensate for the unwanted effects of uniform magnetic stray fields. If and when potential uniform magnetic stray fields can be ignored, then only the MFS 1 is required for accurate distance measurements.

One of the most important features of the here described distance sensor system is, that the distance measurement is not relaying on the absolute magnetic field strength of the Target-Point (Permanent Magnet). For example, this means that this sensor solution can compensate for the effects of aging of the permanent magnet, or changes of the operating temperatures.

Figure 2:
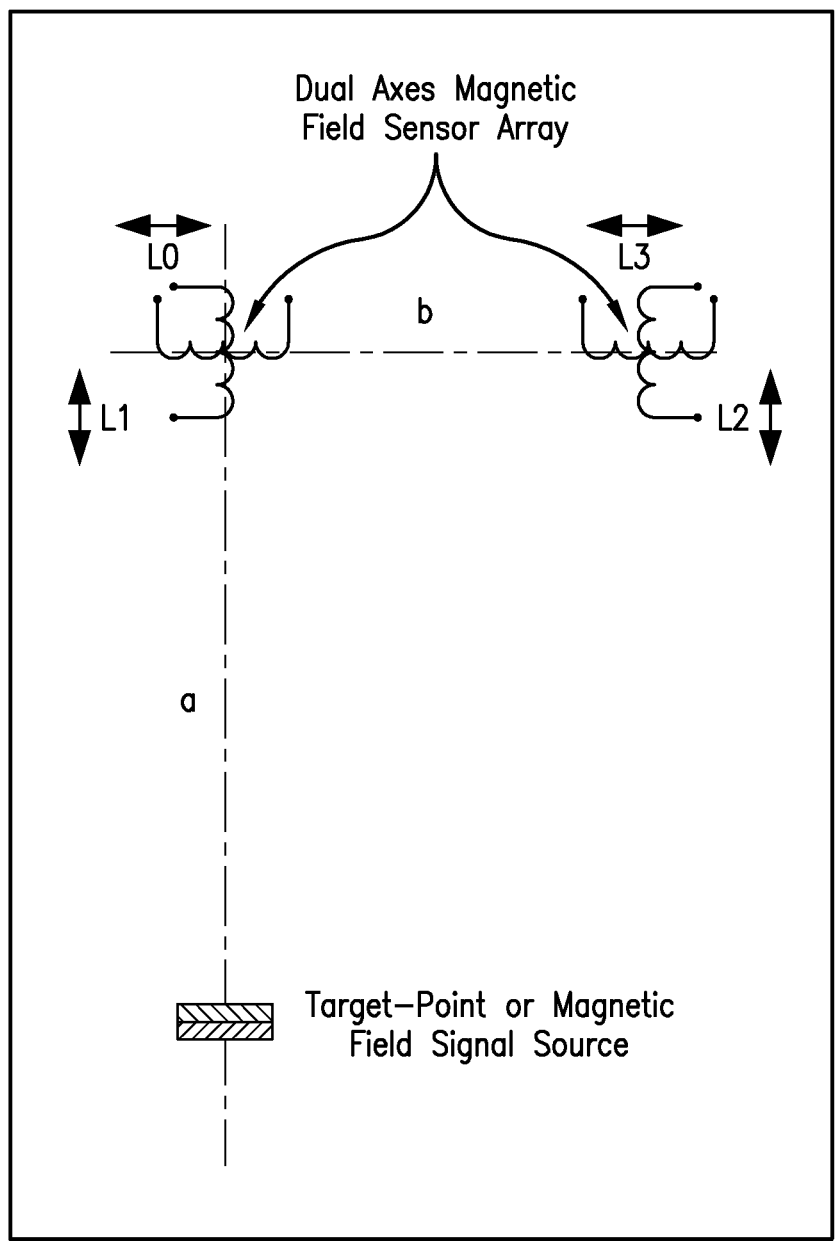
FIG. 2 illustrates the manner in which the sensor system of this invention functions via a dual axes magnetic field sensor array and a target point or magnetic field signal source.

To explain how this sensor system functions, the placements of the individual sensing module components are re-named and described in more detail in FIG. 2. It is assumed that the MFS (Magnetic Field Sensor) array is built by using inductor based sensors. However, any other type of directional sensitive MFS device can be used as well as long as such sensors can distinguish between positive and negative magnetic fields and are capable of directional magnetic field measurements. The most important of the two shown MFS arrays is the one at the right, built from two inductors, called L3 (horizontally placed) and L2 (vertically placed).

When using inductors to measure the magnetic field strength of a permanent magnet (static magnetic field source) then the inductor has to be connected to a flux-gate-type electronic circuit. The output of the flux-gate electronic circuit is a voltage that is equivalent and direct proportionate to the detected and measured magnetic field strength. When using Hall-effect sensors (for example) then there is no need for a flux-gate electronic circuit as most Hall-effect sensors provide an analogue signal output. The Voltage value of the Hall-effect sensor output is direct proportionate to the measured magnetic field strength.

Figure 3:
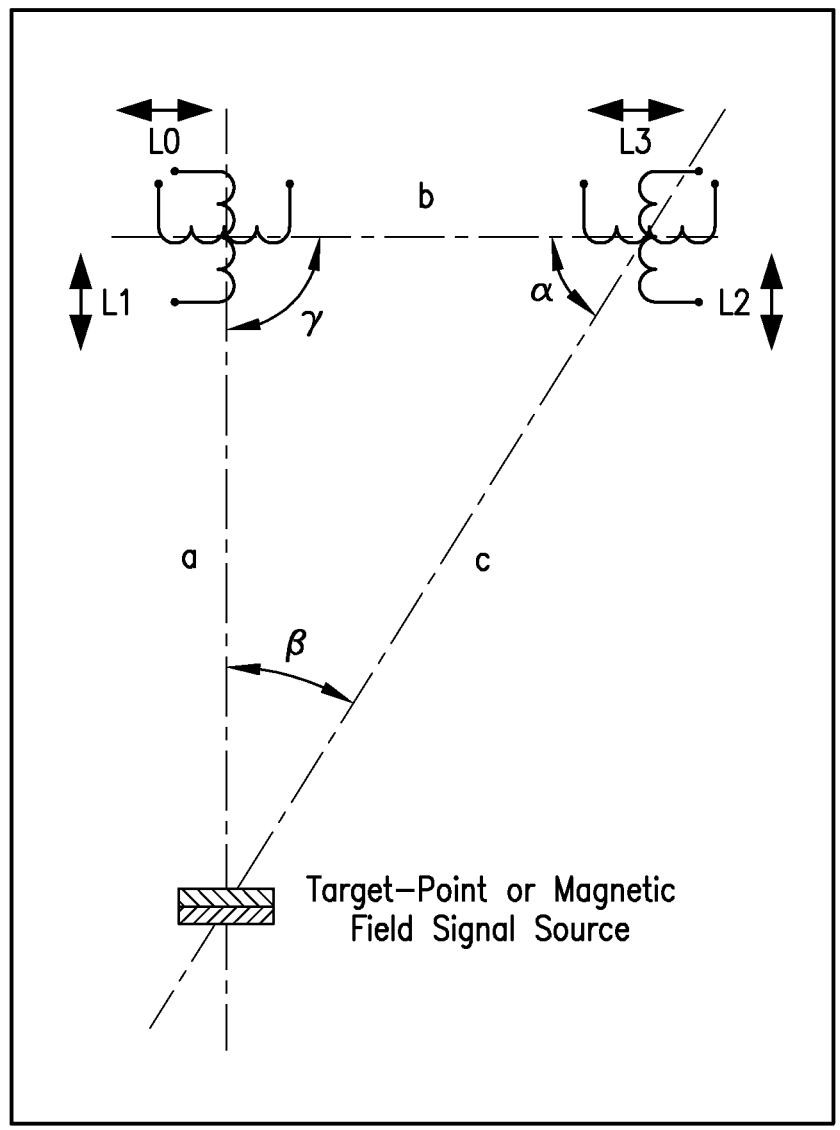
FIG. 3 illustrates the relationship between the movement axis "a" and the horizontal axis "b" in a distance sensor system in accordance with this invention.

As illustrated in FIG. 3, the distance between the two MFS arrays (MFS 1 and MFS 2) is herein defined as "b", while the distance between the MFS array at the left and the Target-Point (permanent magnet) is called "a". In FIG. 3, the angle between the movement axis "a" (which is a straight line between the target-point and the MFS array at the left) and the horizontal axis "b" (the distance between MFS1 and MFS2) is 90°. This angle is identified in FIG. 3 as γ.

Figure 4:
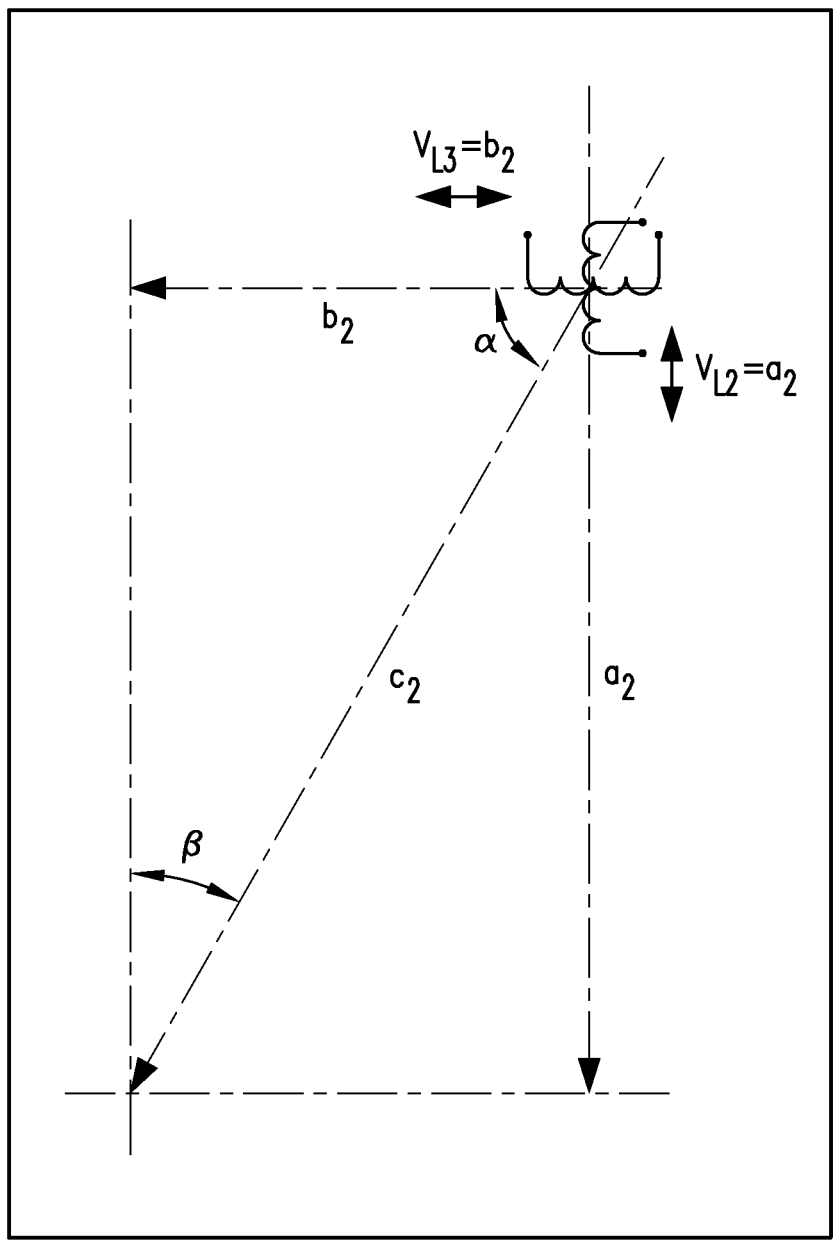
FIG. 4 illustrates how the vector values "a2" and "b2" relate to the signal measurements taken from the MFS sensor array in a distance sensor system in accordance with one embodiment of this invention.

Taking the two values VL2 and VL3, it is possible to calculate the absolute Vector value ("c") caused by the permanent magnet, and the absolute angle this vector is pointing towards. Depending on the applied algorithm, either the angle α or the angle β can be calculated. In the following the algorithm is shown to calculate the angle β. The measurement value of VL2 will change approximately in the same way as the vertical Vector signal portion "$a_2$" is changing and the measurement value VL3 is changing in the same rate as the horizontal Vector signal portion "$b_2$". It should be noted as illustrated in FIG. 4 that the vector values "$a_2$" and "$b_2$" belong to the signal measurements taken from the right MFS Sensor Array (MFS 1). The Vector values "a" and "b" are the distance measurements and distance calculations attained with the sensor system of this invention.

When taking the two values of the signal amplitudes that are indirectly generated by the MFS L3 (here called VL3) and by the MFS L2 (here called VL2) and applying the algorithm:

$$\beta = \arctan(V_{L3}/V_{L2})$$

$$VL3 =^b{_2}$$

$$VL2 =^a{_2}$$

$$\beta = \arctan(b_2/a_2)$$

The result of this algorithm is the angle β. The distance "a" which is the distance between the target point (a permanent magnet) and the base point changes with the changes in angle β and can be calculated utilizing the algorithm provided above. The beauty of this algorithm is that any change of the absolute magnetic signal strength of the used permanent magnet is almost of no consequence. The angle "α" and "β" will remain the same, even if the magnetic signal strength of the permanent is increasing or decreasing by a certain amount within certain reasonable limits.

Figure 5:
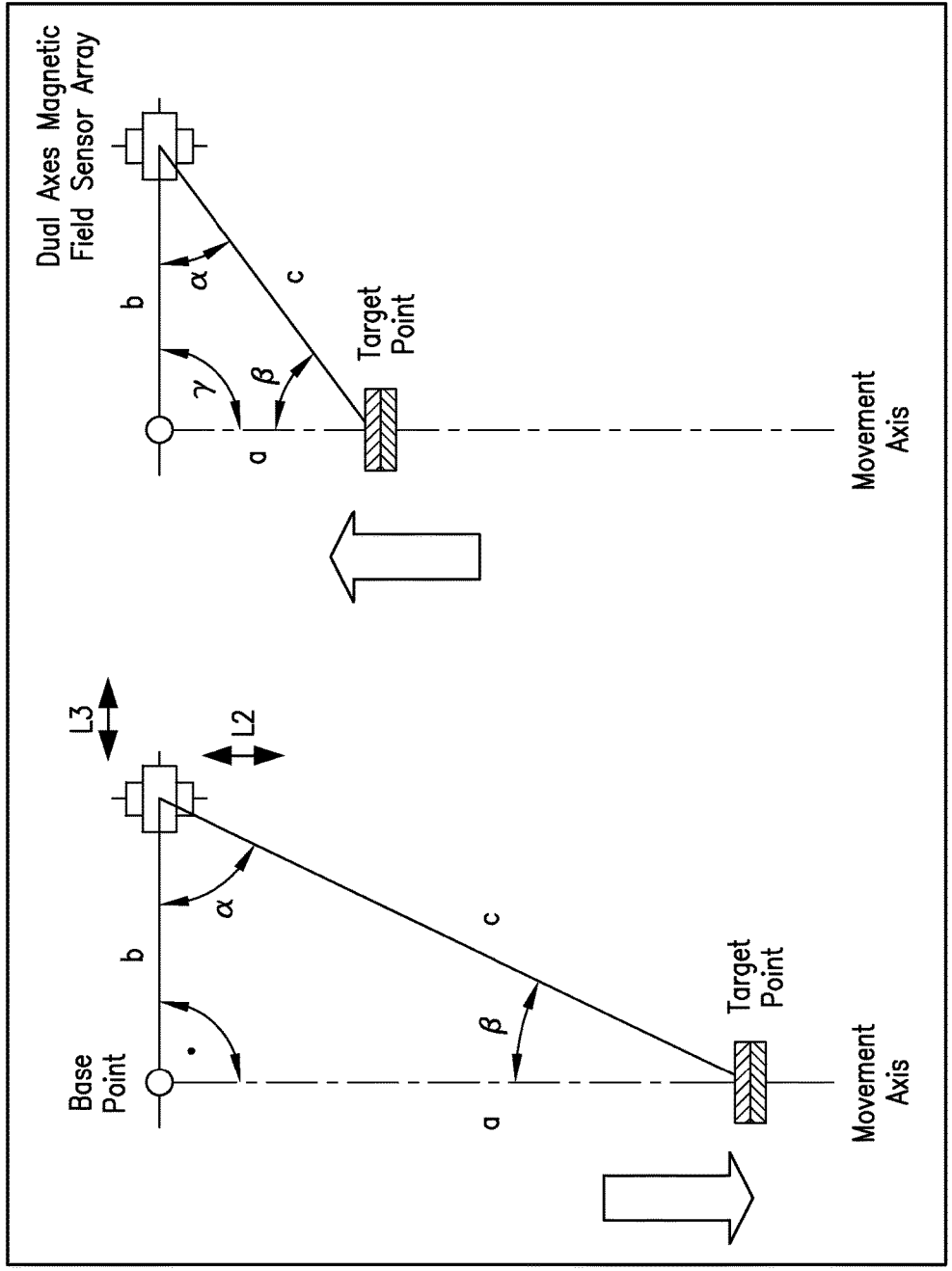
FIG. 5 illustrates the relationship between the angle α and the angle β which can be used to calculate the distance a in accordance with one embodiment of this invention.

As illustrated in FIG. 5, when knowing the angle "α" or "β", then it is easy to calculate the absolute distance "a" by applying the algorithm (Note: the distance "b" is a fixed value and is known):

$a=b\cot(\arctan(b_2/a_2))$

In order to compensate for the unwanted effects of uniform magnetic stray fields (like the Earth Magnetic Field), additional magnetic field sensing devices are used to allow building two sets of "differential mode" MFS arrays. The inductors L0 and L3 will form the first differential mode magnetic field sensor (V L Horizontal=L3−L0), and inductors L1 and L2 will form the second differential mode magnetic field sensor (V L Vertical=L2−L1). As before, the two values VL Horizontal and VL Vertical are now used to calculate the angle "β". Only in this case, this angle value is not affected by uniform magnetic stray fields.

Figure 6:
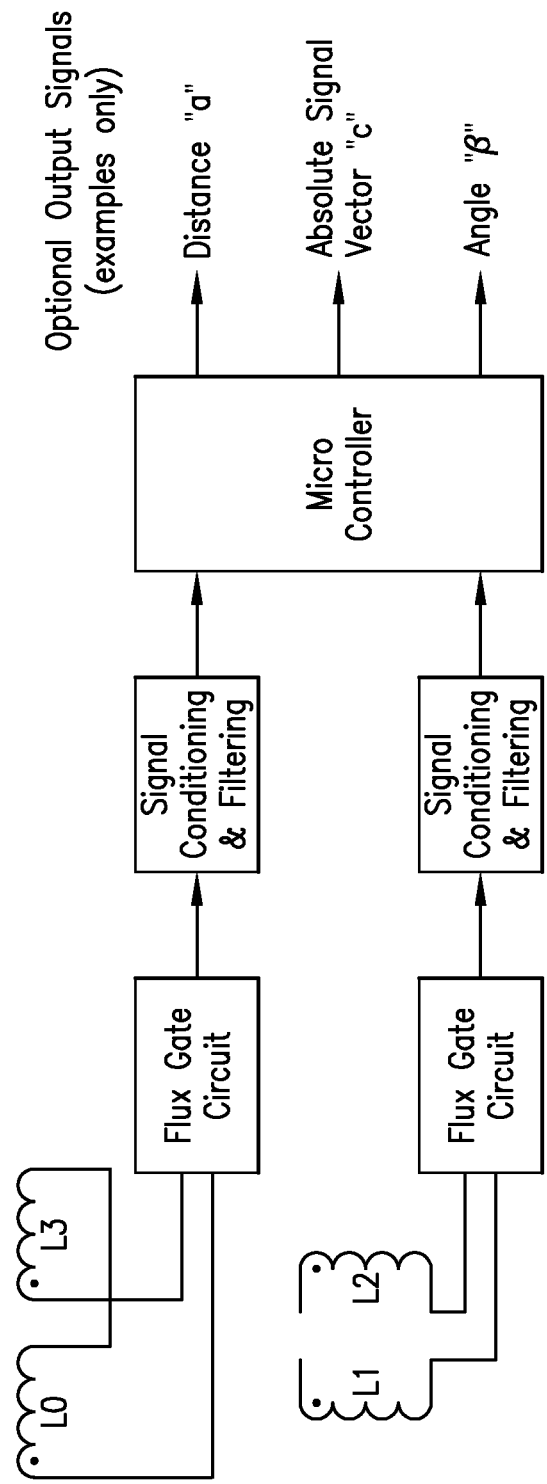
FIG. 6 illustrates sensor electronics that can be employed in conjunction with a distance sensor system of one embodiment of this invention.

FIG. 6 is an illustration of an example of sensor electronics. To execute different type of algorithms, and to keep the flexibility of making changes to the algorithms, it is advisable to use a micro controller in the sensor electronics. However, this is only optional. FIG. 6 illustrates two channel sensor electronics and how the individual magnetic field sensing devices are connected in series with each other. When using Hall-effect sensors then the output voltages of two Hall-effect sensors have to be subtracted from each other using an appropriate analogue circuitry. Alternatively, the four voltages generated by the four Hall-effect sensors used can be fed directly into the Micro Controller where the subtraction activity will be executed.

This application claims benefit of European Patent Application Serial No. EP 13163793.6, filed on Apr. 15, 2013. It should be understood that the features described in individual exemplary embodiments may also be combined with each other in order to obtain a more fail safe air spring height sensor or air spring as well as to enable error detection and correction of the measured height signal. While certain representative embodiments and details have been shown for the purpose of illustrating the subject invention, it will be apparent to those skilled in this art that various changes and modifications can be made therein without departing from the scope of the subject invention.

What is claimed is:

1. A distance measuring device comprising:
   a target module;
   an evaluating module;
   a first magnetic field sensing array; and
   a second magnetic field sensing array,
   wherein the first magnetic field sensing array comprises a first magnetic field sensor and a second magnetic field sensor,
   wherein the target module is movable with respect to the first magnetic field sensing array and the second magnetic field sensing array along a movement trajectory,
   wherein the first magnetic field sensing array is offset from the movement trajectory by a predetermined distance,
   wherein the first magnetic field sensing array and the second magnetic field sensing array sense signals from the target module, the signals being transferred from the first magnetic field sensing array and the second magnetic field sensing array to the evaluating module,
   wherein the evaluating module is adapted to determine the distance from the first magnetic field sensing array to the target module by determining a directional angle of the first magnetic field sensing array with respect to the target module based on the signals from the first magnetic field sensing array, the predetermined distance, an orientation of a main sensing direction of the first magnetic field sensor, and an orientation of a main sensing direction of the second magnetic field sensor.

2. The distance measuring device of claim 1, wherein the target module is a permanent magnet.

3. The distance measuring device of claim 1, wherein the distance measuring device is coupled to an air spring, wherein the air spring comprises a first mounting plate and a second mounting plate, wherein the first magnetic field sensing array and the second magnetic field sensing array are mountable to the first mounting plate, and wherein the target module is mountable to the second mounting plate.

4. The distance measuring device of claim 3, wherein the air spring further comprises a flexible member, wherein the first mounting plate, the second mounting plate and the flexible member define a pressurizable chamber, and wherein the first magnetic field sensing array, the second magnetic field sensing array, and the target module are positioned within the pressurizable chamber.

5. The distance measuring device of claim 1, wherein the first magnetic field sensor is stationary relative to the second magnetic field sensor, wherein a main sensing direction of the first magnetic field sensor is angled with respect to a main sensing direction of the second magnetic field sensor.

6. The distance measuring device of claim 5, wherein the main sensing direction of the first magnetic field sensor is substantially orthogonal to the main sensing direction of the second magnetic field sensor, wherein the main sensing direction of the first magnetic field sensor is substantially parallel to the movement trajectory, and wherein the main sensing direction of the second magnetic field sensor is substantially orthogonal to the movement trajectory.

7. The distance measuring device of claim 1, wherein the second magnetic field sensing array comprises a third magnetic field sensor and a fourth magnetic field sensor, and wherein a main sensing direction of the third magnetic field sensor is angled with respect to a main sensing direction of the fourth magnetic field sensor.

8. The distance measuring device of claim 7, wherein the main sensing direction of the third magnetic field sensor is substantially orthogonal to the main sensing direction of the fourth magnetic field sensor, wherein the main sensing direction of the third magnetic field sensor is substantially parallel to the movement trajectory, wherein the main sensing direction of the fourth magnetic field sensor is substantially orthogonal to the movement trajectory.

9. An air spring comprising:
   a first mounting plate;
   a second mounting plate; and
   a distance measuring device, wherein the distance measuring device comprises:
      an evaluating module,
      a first magnetic field sensing array, and
      a target module,
      wherein the first magnetic field sensing array comprises a first magnetic field sensor and a second magnetic field sensor,
      wherein the first magnetic field sensing array is mountable to the first mounting plate and the target module is mountable to the second mounting plate so as to execute a movement with respect to each other along a movement trajectory,
      wherein the first magnetic field sensing array is offset from the movement trajectory by a predetermined distance,
      wherein the first magnetic field sensing array senses signals from the target module, the signals being transferred from the first magnetic field sensing array to the evaluating module, and wherein the evaluating module is adapted to determine the distance from the first plate to the second plate by determining a directional angle of the first magnetic field sensing array with respect to the target module based on the signals from the first magnetic field sensing array, the predetermined distance, an orientation of a main sensing direction of the first magnetic field sensor, and an orientation of a main sensing direction of the second magnetic field sensor.

10. The air spring of claim 9, further comprising a flexible member, wherein the first mounting plate, the second mounting plate and the flexible member define a pressurizable chamber, and wherein the first magnetic field sensing array and the target module are positioned within the pressurizable chamber.

11. The air spring of claim 9, wherein the first magnetic field sensor is stationary relative to the second magnetic field sensor, wherein a main sensing direction of the first magnetic field sensor is angled with respect to a main sensing direction of the second magnetic field sensor.

12. The air spring of claim 11, wherein an angle between the movement trajectory and a horizontal axis between a reference point positioned within the movement trajectory and the first magnetic field sensing array is substantially orthogonal, wherein the main sensing direction of the first magnetic field sensor is substantially orthogonal to the main sensing direction of the second magnetic field sensor, wherein the main sensing direction of the first magnetic field sensor is substantially parallel to the movement trajectory, and wherein the main sensing direction of the second magnetic field sensor is substantially orthogonal to the movement trajectory.

13. The air spring of claim 12, wherein the distance measuring device further comprises a second magnetic field sensing array that senses signals from the target module, and wherein the second magnetic field sensing array is located at the reference point.

14. The air spring of claim 9, wherein the distance measuring device further comprises a second magnetic field sensing array that senses signals from the target module, wherein the signals sensed by the second magnetic field sensing array are transferred to the evaluating module, and wherein the evaluating module is further adapted to use the signals sensed by the second magnetic field sensing array to correct for effects of stray magnetic fields.

15. The air spring of claim 14, wherein the second magnetic field sensing array comprises a third magnetic field sensor and a fourth magnetic field sensor, wherein a main sensing direction of the third magnetic field sensor is angled with respect to a main sensing direction of the fourth magnetic field sensor, wherein the main sensing direction of the third magnetic field sensor is substantially orthogonal to the main sensing direction of the fourth magnetic field sensor, wherein the main sensing direction of the third magnetic field sensor is substantially parallel to the movement trajectory, and wherein the main sensing direction of the fourth magnetic field sensor is substantially orthogonal to the movement trajectory.

16. An air spring comprising:
a first mounting plate;
a second mounting plate; and
a distance measuring device, wherein the distance measuring device comprises:
an evaluating module,
a first magnetic field sensing array,
a second magnetic field sensing array, and
a target module,
wherein the first magnetic field sensing array is mountable to the first mounting plate and the target module is mountable to the second mounting plate so as to execute a movement with respect to each other along a movement trajectory,
wherein the first magnetic field sensing array is offset from the movement trajectory by a predetermined distance, the first magnetic field sensing array including a first magnetic field sensor and a second magnetic field sensor,
wherein the second magnetic field sensing array comprises a third magnetic field sensor and a fourth magnetic field sensor,
wherein the first magnetic field sensor, the second magnetic field sensor, the third magnetic field sensor, and the fourth magnetic field sensor sense signals from the target module, the signals being transferred from the first magnetic field sensing array to the evaluating module, and
wherein the evaluating module is adapted to determine the distance from the first plate to the second plate based on the signals, an orientation of a main sensing direction of the first magnetic field sensor, an orientation of a main sensing direction of the second magnetic field sensor, an orientation of a main sensing direction of the third magnetic field sensor, and an orientation of the main sensing direction of the fourth magnetic field sensor.

17. The air spring of claim 16, further comprising a flexible member, wherein the first mounting plate, the second mounting plate and the flexible member define a pressurizable chamber, and wherein the first magnetic field sensing array and the target module are positioned within the pressurizable chamber.

18. The air spring of claim 16, wherein the main sensing direction of the first magnetic field sensor is angled with respect to the main sensing direction of the second magnetic field sensor, wherein the main sensing direction of the first magnetic field sensor is substantially orthogonal to the main sensing direction of the second magnetic field sensor, wherein the main sensing direction of the first magnetic field sensor is substantially parallel to the movement trajectory, and wherein the main sensing direction of the second magnetic field sensor is substantially orthogonal to the movement trajectory.

19. The air spring of claim 18, wherein the second magnetic field sensing array is located at the reference point, and wherein the evaluating module is further adapted to use the signals sensed by the second magnetic field sensing array to correct for effects of stray magnetic fields.

20. The air spring of claim 19, wherein the second magnetic field sensing array is mountable to the first mounting plate, wherein the air spring further comprises a flexible member, wherein the first mounting plate, the second mounting plate and the flexible member define a pressurizable chamber, and wherein the first magnetic field sensing array, the second magnetic field sensing array, and the target module are positioned within the pressurizable chamber.

* * * * *